United States Patent
Lee et al.

(10) Patent No.: US 7,271,839 B2
(45) Date of Patent: Sep. 18, 2007

(54) DISPLAY DEVICE OF FOCAL ANGLE AND FOCAL DISTANCE IN IRIS RECOGNITION SYSTEM

(75) Inventors: Won Hee Lee, Gyeonggi-do (KR); Ae Kyung Yang, Seoul (KR); Jang Jin Chae, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 599 days.

(21) Appl. No.: 10/096,967

(22) Filed: Mar. 14, 2002

(65) Prior Publication Data
US 2002/0130961 A1   Sep. 19, 2002

(30) Foreign Application Priority Data
Mar. 15, 2001 (KR) ............... 2001-13377
Mar. 15, 2001 (KR) ............... 2001-13378
May 12, 2001 (KR) ............... 2001-25992

(51) Int. Cl.
*H04N 2/232* (2006.01)
*H04N 7/14* (2006.01)
*G06K 9/00* (2006.01)

(52) U.S. Cl. ............... 348/346; 348/14.16; 348/78; 382/117

(58) Field of Classification Search ............... 382/117; 348/14.16, 94, 95, 116, 78, 218, 333.03, 135, 348/340, 344, 51, 56, 333.02, 346; 396/51; 351/208
See application file for complete search history.

(56) References Cited

U.S. PATENT DOCUMENTS

| | | | |
|---|---|---|---|
| 4,257,687 A * | 3/1981 | Kohayakawa | 351/208 |
| 6,064,752 A * | 5/2000 | Rozmus et al. | 382/117 |
| 6,299,306 B1 * | 10/2001 | Braithwaite et al. | 351/208 |
| 6,333,988 B1 * | 12/2001 | Seal et al. | 382/117 |
| 6,344,797 B1 * | 2/2002 | Hosny | 340/573.1 |
| 6,490,365 B2 * | 12/2002 | Horiguchi et al. | 382/117 |
| 6,594,377 B1 * | 7/2003 | Kim et al. | 382/117 |
| 6,652,099 B2 * | 11/2003 | Chae et al. | 382/117 |
| 6,687,389 B2 * | 2/2004 | McCartney et al. | 382/117 |
| 6,992,717 B2 * | 1/2006 | Hatano | 348/333.03 |
| 7,068,820 B2 * | 6/2006 | Nakaigawa et al. | 382/118 |
| 7,095,901 B2 * | 8/2006 | Lee et al. | 382/117 |
| 2002/0008768 A1 * | 1/2002 | Takada et al. | 348/333.03 |
| 2002/0106113 A1 * | 8/2002 | Park | 382/117 |
| 2002/0130961 A1 * | 9/2002 | Lee et al. | 348/333.03 |
| 2002/0131622 A1 * | 9/2002 | Lee et al. | 382/117 |
| 2003/0085996 A1 * | 5/2003 | Horiguchi | 348/139 |
| 2005/0264758 A1 * | 12/2005 | Wakamori | 351/208 |

(Continued)

FOREIGN PATENT DOCUMENTS

JP   10-137223   5/1998

(Continued)

*Primary Examiner*—David Ometz
*Assistant Examiner*—John M. Villecco
(74) *Attorney, Agent, or Firm*—Ked & Associates, LLP

(57) ABSTRACT

The present invention relates to a display device of a focal angle and distance in an iris recognition system, in which the device includes: a distance measurer for measuring a distance between a user and an iris recognition camera, and an indicator for quantitatively indicating a forward-backward distance and a right and left or up and down direction the user should move, in accordance with the distance measured by the distance measurer.

23 Claims, 9 Drawing Sheets

U.S. PATENT DOCUMENTS

2005/0270483 A1 * 12/2005 Fujimatsu et al. .......... 351/206

FOREIGN PATENT DOCUMENTS

| JP | 2000-259817 | | | 9/2000 |
|----|-------------|---|---|--------|
| JP | 2000259817 A | * | 9/2000 |
| JP | 2002107805 A | * | 4/2002 |
| JP | 2003108983 A | * | 4/2003 |
| JP | 2005309901 A | * | 11/2005 |

* cited by examiner

DISPLAY DEVICE OF FOCAL ANGLE AND FOCAL DISTANCE IN IRIS RECOGNITION SYSTEM

BACKGROUND OF THE INVENTION

1. Field of the Invention

The present invention relates to an iris recognition system. In particular, the present invention relates to a display device of a focal angle and distance in an iris recognition system, which enables to focus a camera to obtain more accurate iris images, measure a focus angle and distance between the camera and a user, and using the measurement result, to instruct the user which direction and how far he should go with respect to the camera.

2. Description of the Related Art

As well known already, there have been a number of systems for security, crime prevention, and identity authentication, such as the traditional contact cards system or the non-contact cards system and up to the fingerprint recognition system. The iris recognition system has certainly joined this stream for authenticating a person's identity before allowing or rejecting the person to enter a particular place or to access specific data.

Among those, the iris recognition system is considered to be the best for its high recognition rate compared with the fingerprint recognition, and for its high accuracy. The iris recognition system is a technique for authenticating a person by comparing a pre-registered iris data with a new iris data that has been prepared by capturing iris images using a video camera and making iris pattern features into data using an image process technique.

FIG. 1 is a schematic diagram of a general iris recognition system in a related art. With reference to FIG. 1, operation of the iris recognition system is now explained below.

As a user approaches the iris recognition system, a distance measurement sensor 109 measures the distance between the user to the system, and a controller 105, having received the distance measurement value through an actuator 107, decides whether the distance measurement value is within the operation limit.

If it turns out that the user is within the operation limit, a control signal is sent out to the actuator 107 to extract iris images. And, the actuator 107 sends an active signal to an external indicator 108 and lets the user know that the system is on. When the user puts his or her eyes on an optical axis of a camera 103 through an optical window 101, a cold mirror 102 blocks a visible ray and passes infrared rays. And, the system indicates whether the iris of the user should be placed to make sure the user's eyes are properly positioned on the optical axis of the camera 103.

The control device 105, on the other hand, is provided with the distance from the distance measurement sensor 109 to the user, and based on the distance measurement value, it calculates zoom and focus values of the camera 103 and performs zoom in/zoom out and focusing control. Later, the control device 105 adjusts the intensity of an illumination device 106 through the actuator 107 in accordance with the distance measurement value, and photographs the iris image using the camera 103. The photographed iris image goes through a signal process to be appropriate for the iris image analysis at a frame grabber 104, and based on the information about the processed iris image, the control device 105 recognizes the iris and decides whether or not to authenticate the user.

The performance of this iris recognition system is totally dependent on how fast and how accurately it can recognize the iris.

There are different kinds of techniques of extracting the iris image in order to photograph the iris of the user from an appropriate distance. For example, sometimes the user himself has to focus the camera by looking at the screen and moving back and forth, or in some cases, several cameras are used at one time to find out where the user's face and eyes are and photograph the user's iris image. Also, some obtain the iris image by using the distance measurement sensor which measures the distance between the camera and the user in order to focus the camera automatically.

First of all, it would be pointless to say that the user would feel uncomfortable if he personally has to move around within a certain distance to focus the camera, while looking at the screen. Also, in this case, a single light source is used. Therefore, if the user wears glasses, the reflected image from the glasses makes it difficult to catch more accurate iris images. However, to prevent such problem, the user should keep moving while looking at the screen for himself until no reflection occurs, increasing inconvenience to the user.

Fortunately, using several cameras to focus the camera and obtain iris images has somewhat solved the trouble the user had to go through. But this time, the equipment is very complicated for a normal person to operate and it required very sophisticated control. In other words, the system uses two cameras for finding out where the user's face and eyes are, and another camera for obtaining the iris image. Although the system is convenient to use in that the user does not have to focus his eyes personally for the iris recognition because the system automatically focuses the camera and catches the iris image, the system configuration itself is very complicated in order to use several cameras and operate each camera systematically and electrically, Lastly, in case the distance measurement sensor is used to focus the camera and photograph iris images, the distance measurement sensor senses a person's approach and focuses the camera based on the inputted images in possession and the focus values outputted from the camera.

However, since this technique also uses a single light source, the reflection problem due to the glasses of the user is likely to happen any time. As an attempt to avoid the secondary reflex due to the glassed, three LED (light-emitting diode) illuminations were put on the left side, the right side, and the upper side. But it was still uncomfortable to use because one should keep changing positions of the illuminations to get the images.

FIG. 2 is a block diagram of an autofocus adjusting device using a distance measurement sensor.

As shown in the drawing, a distance measurer 202 measures the distance between the user and the camera 205 at designated regular time intervals using the distance measurement sensor 201, and outputs the distance information successively. A distance processor 203, using the distance information, catches characteristics of the user's movement. More specifically, based on that successive distance information, the distance processor 203 measures the user's movement speed. If the speed is a positive number (+), it means that the user is approaching, and if the speed is a negative number (−), it means the user is going away, and if the absolute speed is within the limit, it means the user stopped moving.

A camera operation controller 204, using the information about distance, speed and acceleration provided from the distance processor 203, controls the operation of the camera 205 when the use stands still. Here, even when the user's movement is not yet stabilized, it is important to estimate beforehand where the user is going stop and drive the camera's lens to that position because it certainly reduces time necessary for focusing the camera.

When the user's movement is stabilized, the camera operation controller 204 adjusts the camera's zoom and focus based on the distance measurement values. Considering that the user can't be perfectly still but keeps moving little bit and the measured distance values are not necessarily the actual distances to the user's eyes, it is rather natural to accept the possibility of measurement error to a certain degree. Therefore, a fine adjustment process is carried out involving the camera operation controller 204, in which the camera operation controller focuses the camera by analyzing the successively inputted iris image from an image controller 206, calculating a focus range therefrom, moving a zoom and focus lens until the focus range becomes appropriate for performing authentication, and continuing the tracking until a maximum value is obtained.

However, if the user is wearing glasses, the iris image of the user could be reflected in accordance with the angle between the glasses and the LED mounted at an illuminator 208. To prevent this problem, the image processor 206 detects a possible reflection degree before calculating the focus range, and outputs the glasses reflection information to an illumination controller 207.

In a way of avoiding the glasses' reflection, the illumination controller 207 controls the lighting condition of the illumination LED based on the glasses reflection information, and changes the reflected positions from the glasses as well. In this manner, the reflection by the glasses can be prevented and the iris image recognition can be done successfully through an analysis on the iris images obtained from the camera 206.

However, one problem of the system is that it depends too heavily on the distance measurement sensor to measure the motion direction and distance of the lens when the camera needs to be focused. Thus, if the distance measurement sensor does not give accurate information on the distance to the user's eyes, which unfortunately does occur very often, the motion direction of the lens could be designated to a wrong direction and the time for adjusting the focus might take longer than expected. In addition, since the user has to approach within the permitted limit of the iris recognition system, the system is not that convenient for the user.

On the other hand, a combination camera for a video conference and iris recognition, which combined a camera for a video conference and an iris recognition camera into one system, has been introduced for recognizing an iris for an equipment like a personal computer system.

FIG. 3 is a diagram explaining a relation between the combination camera and the user in terms of position and distance.

As depicted in the drawing, the iris recognition system requires the user to adjust the focal distance (D) and the focal angle accurately while watching the combination camera for a video conference and iris recognition to get desired iris images.

In other words, the focal angle means the operation limit of X-axis and Y-axis between the user and the iris recognition camera, and the focal distance means the operation limit of Z-axis between the user and the iris recognition camera.

According to the system shown in FIG. 4, the user is supposed to put his eyes on the place where the distance and the focus adjusting image in the iris recognition camera with a single focus lens (use two circles with different colors) conform to each other. In short, the system does not start iris recognition until the user looks at the place where two points in the camera converge.

For a better adjustment of the focus position, the user is recommended to keep a certain distance from the camera (i.e., 44 cm to 48 cm), and is encouraged to adjust the focal angle using a blue circle and a white circle in the camera lens. In other words, the user is supposed to keep looking at the camera and move towards where he can adjust the focal angle until the two circles become one.

FIG. 4(a) illustrates a case where the focal angle is adjusted and (b) illustrates a case where the focal angle went wrong.

FIG. 5 illustrates an internal configuration of an optical system for leading and guiding the user to adjust the focal angle in the combination camera for a video conference and for iris recognition in the prior art.

Referring to FIG. 5, the optical system includes an iris recognition camera lens 301, a reflection mirror 302 for sending eye images of the user that are incidented through the lens, and an iris recognition camera 303. Moreover, as shown in FIG. 4, a light emitting diode (LED) 304 for making two circles and displaying them is mounted on a back surface of the reflection mirror 302, and a circular hole 302a is formed on the reflection mirror 302 for transmitting the LED 304 light.

In this manner, the LED 304 light transmits the lens 301 through the hole 302a, and the user can see the circular light with a designated color and adjust the focal angle by moving the lens 301 right and left and up and down, until the circle with different color and size on the lens matches with the circle by the LED.

However, this device strongly encourages the user to practice to get the feeling of the focus position beforehand using a tapeline or something until he becomes intuitively accustomed to the focus position to a certain level. But for the user, it is rather difficult and inconvenient to adjust the focus position, making the white circle out of those two circles looking in the camera lens become one with the blue circle at the same time. Considering the small sized lens and visual difference of the user's eyes, the task seems to be even harder.

Moreover, because the system uses two lenses and the distance between the LED and the lens is very short, the user, even when he is not at the right front of the lens, could see the LED light, so he cannot be sure whether the focal angle is properly adjusted or not. Further, there is a white point marked on the surface of the lens such that the user can see the LED light from any angle and focus, but this can be an obstacle to obtain good iris images. On top of boring a hole in the reflex mirror to transmit the LED light, if the user looks at the iris recognition camera from a different angle rather than the front, it is very hard to adjust the focal angle since the camera would not look like a circle to the user then.

SUMMARY OF THE INVENTION

It is, therefore, an object of the present invention to provide a display device of a focal angle and distance in an iris recognition system, which enables to calculate a distance between a camera and a user, and based on the calculated distance information, to lead and guide the user to which direction and how far he should move for acquiring an iris image in an iris recognition system.

Another object of the present invention is to provide a display device of a focal angle and distance in an iris recognition system, which enables to adjust a focal angle and a focal distance of a user to a camera more accurately and easily, simply making the user keep looking at an iris recognition camera while moving.

Still another object of the present invention is to provide a display device of a focal angle and distance in an iris recognition system, which enables a user to adjust both the focal angle and the focal distance to a camera by looking at an iris recognition camera, taking advantage of a visible ray and an image with a designated color and a shape that are fully incidented onto a camera lens from an iris recognition camera using a single focus towards the user's view.

To achieve the above object, there is provided a display device of a focal angle and distance in an iris recognition system, in which the device includes a distance measurer for measuring a distance between a user and an iris recognition camera, and an indicator for quantitatively indicating a forward-backward distance and a right and left or up and down direction the user should move, in accordance with the distance measured by the distance measurer.

The indicator indicates a direction and distance for the user to move from the inside of the iris recognition camera.

Also, the indicator, being formed on an external side or internal side of an iris recognition device around the iris recognition camera, indicates a direction and distance for the user to move from a position in the user's watch.

Moreover, the indicator indicates a direction and distance for the user to move by dividing the direction and the distance into at least two levels.

Further, the indicator indicates a direction and distance for the user to move by outputting a light with different intensities and/or colors to help the user to be able to distinguish the distance from the direction he should move.

Another aspect of the present invention provides a display device of a focal angle and distance in an iris recognition system, the device including: an illumination device; a light emitter for indicating a focal angle to the user; and a light optics for guiding the user to the focal angle through sharpness of the visible ray dependent on the focal angle by transmitting the visible ray irradiated from the light emitter onto the user and reflecting an image of the user.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
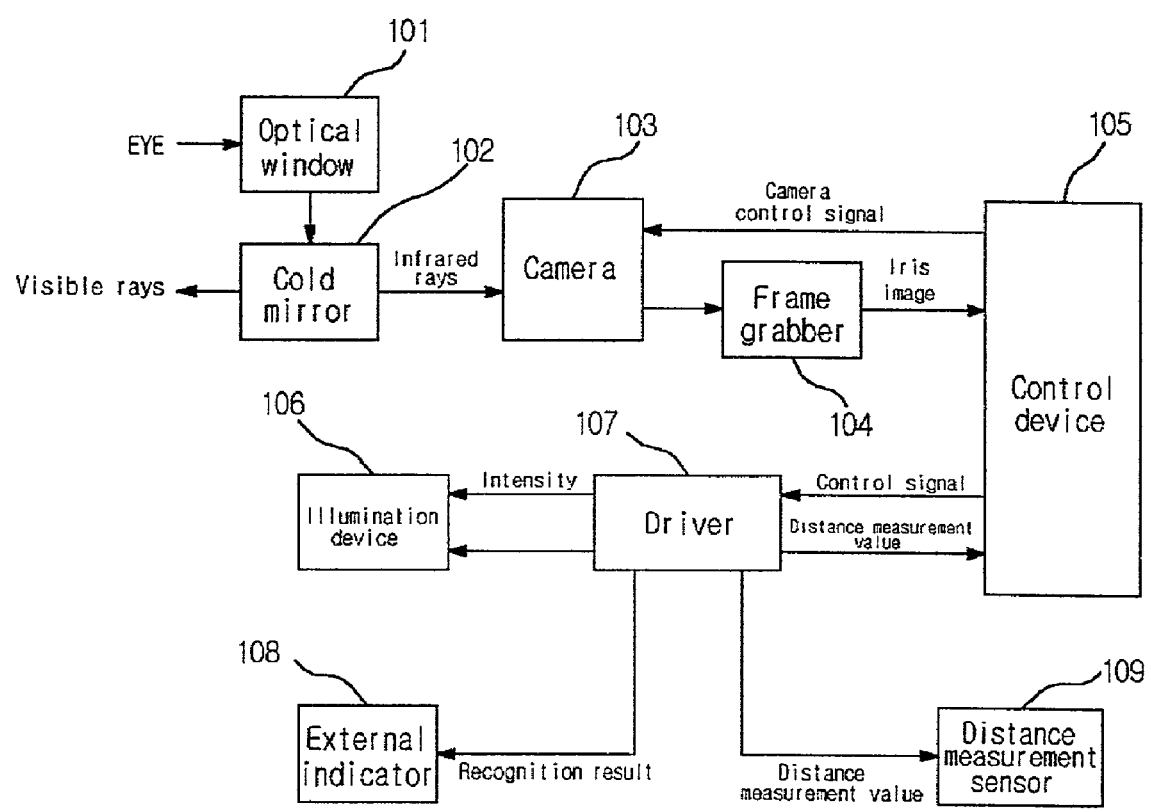
FIG. 1 is a schematic diagram of an iris recognition system in the prior art.

Preferred embodiments of the present invention will now be described with reference to the accompanying drawings. In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 6:
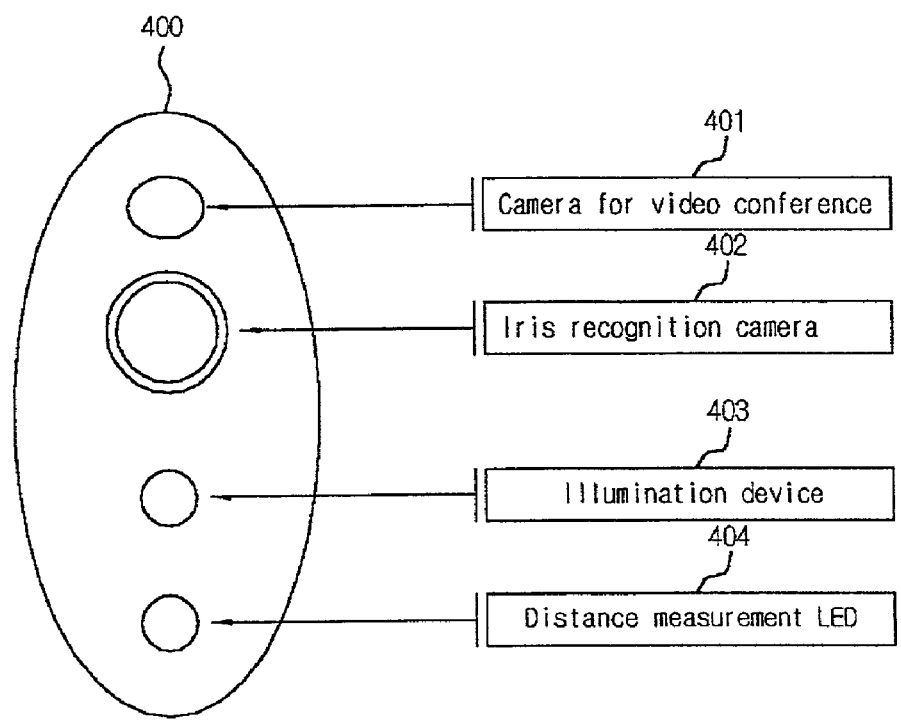
FIG. 6 is a front view of an optical system unit explaining a method for adjusting a focal angle according to a first preferred embodiment of the present invention.
Figure 6:
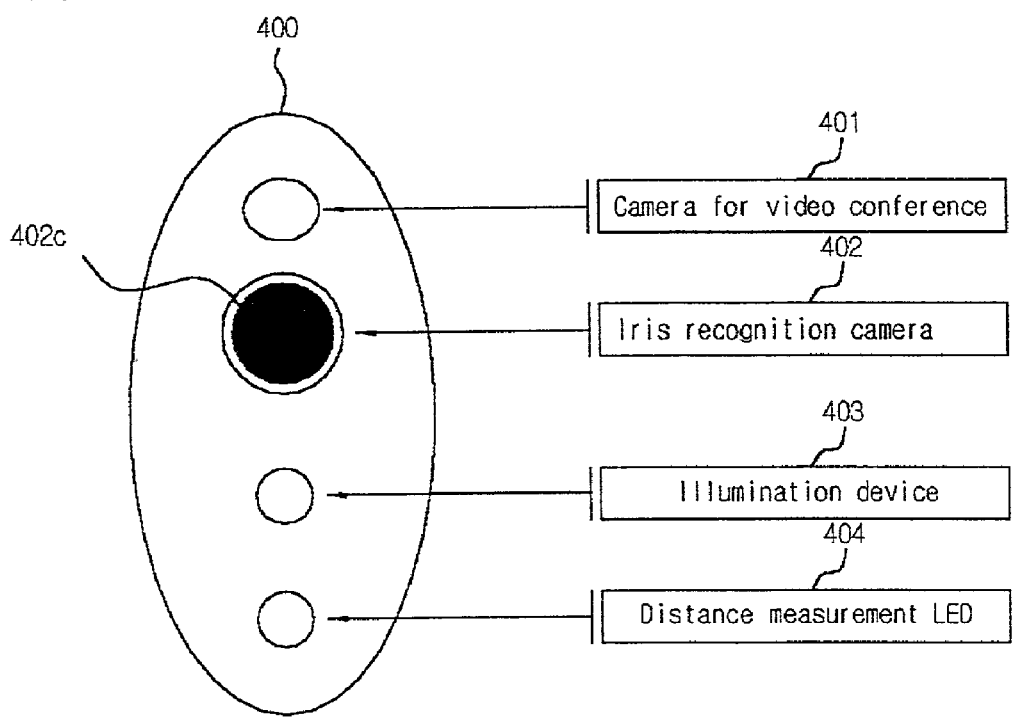

FIG. 6 is a front view of an optical system unit explaining a method for adjusting a focal angle according to a first preferred embodiment of the present invention.

Referring to FIG. 6, the combination optical unit 400 for video conference and iris recognition system includes a camera for a video conference 401, an iris recognition camera 402, an illumination device 403, and a distance detection sensor light emitting diode (LED) 404.

Specifically speaking, the camera for a video conference 401 is used for acquiring the images of the user (mainly the user's face) for the sake of the video conference.

The iris recognition camera 402 is used for acquiring eye images of the user necessary to recognize the user's iris.

The illumination device 403 is used for providing an infrared ray illumination necessary for photographing an iris image to be recognized.

The distance detection sensor 404 is used for measuring a distance between the user and the camera.

It is now explained about the operation of the optical system unit according to the first preferred embodiment of the present invention.

To begin with, the user looks at the iris recognition camera 402. Then, for a more accurate adjustment of an focal angle, the user is encouraged to keep moving his face right and left or up and down, complying with the sharpness of the angle displaying visible ray that is projected from the inside of the iris recognition camera 402 until he finds a position where the angle displaying visible ray looks very clearly.

That is to say, if the focal angle is not properly adjusted, the angle displaying visible ray projected from the inside of the iris recognition camera 402 is blurred or is not visible at all as shown in FIG. 6(*a*). In contrast, as FIG. 6(*b*) shows, if the focal angle is well adjusted, the angle displaying visible ray projected from the inside of the iris recognition camera 402 looks very clearly.

Figure 7:
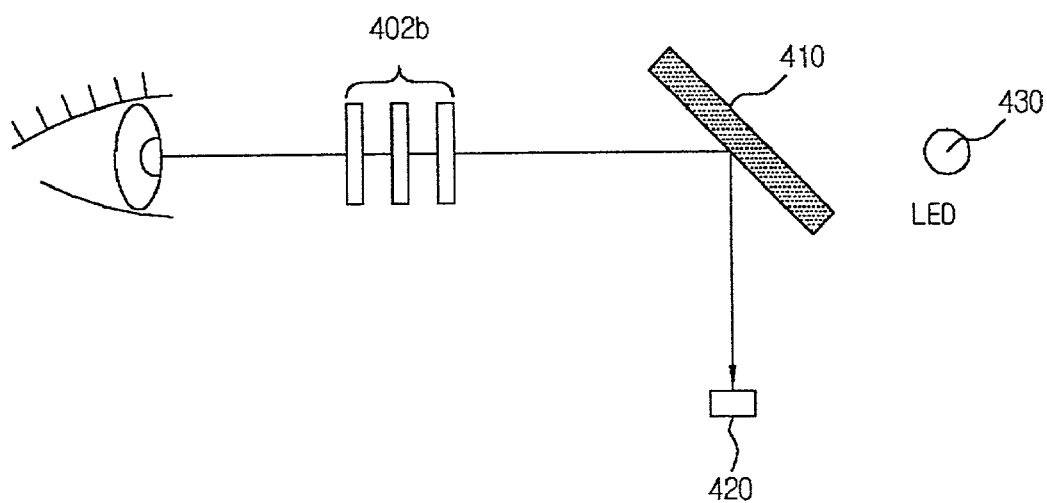
FIG. 7 is an explanatory diagram of a configuration of an optical system according to the first preferred embodiment of the present invention.

FIG. 7 is an explanatory diagram explaining a configuration of an optical system according to the first preferred embodiment of the present invention.

With reference to FIG. 7, the optical system includes a camera lens 402*b* mounted at the iris recognition camera 402, a hot mirror 410, and a LED 430 for outputting a light for use of a focal angle display.

Specifically speaking, the LED 430 is located at a rear side of the hot mirror 410.

The hot mirror 410 is visible to the user through the iris recognition camera lens 402*b* as the visible ray outputted from the LED 430 transmits the mirror. Also, the infrared rays (IR) necessary to the iris recognition are reflected by the hot mirror 410 and sent to the iris recognition camera 420.

According to the first preferred embodiment of the present invention illustrated in FIGS. 6 and 7, the user is supposed to move towards the direction for adjusting the focal angle while keeping looking at the iris recognition camera 402. In fact, the LED 430 light the user feels varies depending on which direction he turns to.

In other words, the light which has been generated by the LED 430 and projected to the user through the hot mirror 410 and the lends 402*b* is not seen especially when the focal angle between the user and the camera are much deviated from each other. However, if the focus is deviated just a little bit, the user can still see the light even though it is blurred, and if the focal angle between the user and the camera is perfectly matched, the user can see the light very clearly.

Especially when the angle the user gazes at the camera 402 reaches the focal angle precisely, the user's gaze will be laid on a straight line that connects the camera 402, the lens 402*b*, the hot mirror 410, and the LED 430. This is how the user can see the light of the LED 430 very clearly.

In short, depending on the sharpness of the LED light, the user can realize almost intuitively whether he is adjusting the focal angle appropriately or not.

On the other hand, even if the configuration described above could be slightly modified and is applied to a general iris recognition system without the camera for a video conference 401, the system is still very convenient for people to use.

Besides what have been discussed before, the first embodiment of the present invention is also advantageous for securing more space in a low part of the inside of the camera because the LED 430 is located at the rear side of the hot mirror 410, that is, back of the hot mirror 410.

A second preferred embodiment of the present invention is now explained as follows.

Figure 8:
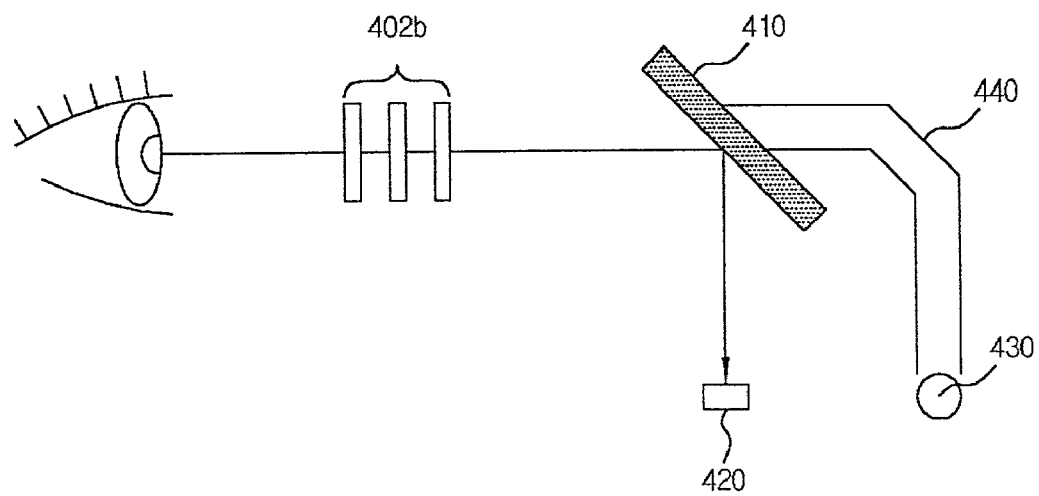
FIG. 8 is a front view of an optical system unit explaining a method and apparatus for adjusting a focal angle according to a second preferred embodiment of the present invention.

FIG. 8 is a front view of an optical system unit explaining a method and apparatus for adjusting a focal angle according to the second preferred embodiment of the present invention;

Most part of the second embodiment of the present invention is pretty same with the first embodiment except that the second embodiment includes the camera lens 402*b* for the iris recognition camera 402, the hot mirror 410, and the LED 430 for outputting a light necessary for adjusting the focal angle. Especially, the LED 430 is disposed at the lower part (i.e., the bottom space of the lens) of the hot mirror 410, and light transmitting matter 440 is connected from the LED 430 to the hot mirror 410 in order to induce the LED 430 light to the hot mirror 410.

Preferably, a prism is used for the light transmitting matter 440.

The system enables the user to see the hot mirror 410 through the iris recognition camera lens 402*b* by transmitting the visible ray outputted from the LED 430. And, the infrared rays for iris recognition are reflected and sent out the iris recognition camera 420.

Thusly configured system also yields the same effect with the second embodiment of the present invention.

In addition, the second embodiment of the present invention depicted in FIGS. 6 and 8 is advantageous in that it shortens the length of the tube in the iris recognition camera by putting the LED 430 on the lower part of the hot mirror 410, that is, the bottom space of the lens.

As aforementioned, the device for adjusting the focal angle in the iris recognition system according to the present invention uses three iris recognition camera lens 402*b* so the light transmission distance to the reflection mirror is relatively long. Moreover, because of the long distance between the LED and the lends, when the user moves away from the front part of the lens, the user cannot see the LED light or even if he sees, he can see only blurred LED light. This explains why the present embodiment took the configuration that enables to lead and guide the user to adjust the focal angle more conveniently simply depending on the sharpness of the LED according to the gaze angle of the user.

Therefore, there is no need to put a dot on the surface of the lens or to make a hole on the mirror as it has been done in the prior art.

Another advantage of the present invention particularly for the iris recognition system using a single focus lens is that it makes easy and convenient for the user to adjust the focal angle for iris recognition by leading or helping the user to be able to decide the focal angle of the iris recognition camera almost intuitively.

Furthermore, unlike the traditional technique in the prior art, the present invention does not make the user conform two points on a concentric circle in a way to focus the combination camera for a video conference and iris recognition with a single focus lens. Instead, the user can adjust the focal angle by simply indicating whether he can see the LED light clearly or not.

All of the preferred embodiments of the present invention explained up to this point are directed to one common goal, that is, to obtain more accurate user's iris image more conveniently and easily.

The embodiments introduced here also suggest a system configuration for forming the user's iris image on an accurate position with respect to X-axis, Y-axis, and Z-axis.

Figure 9:
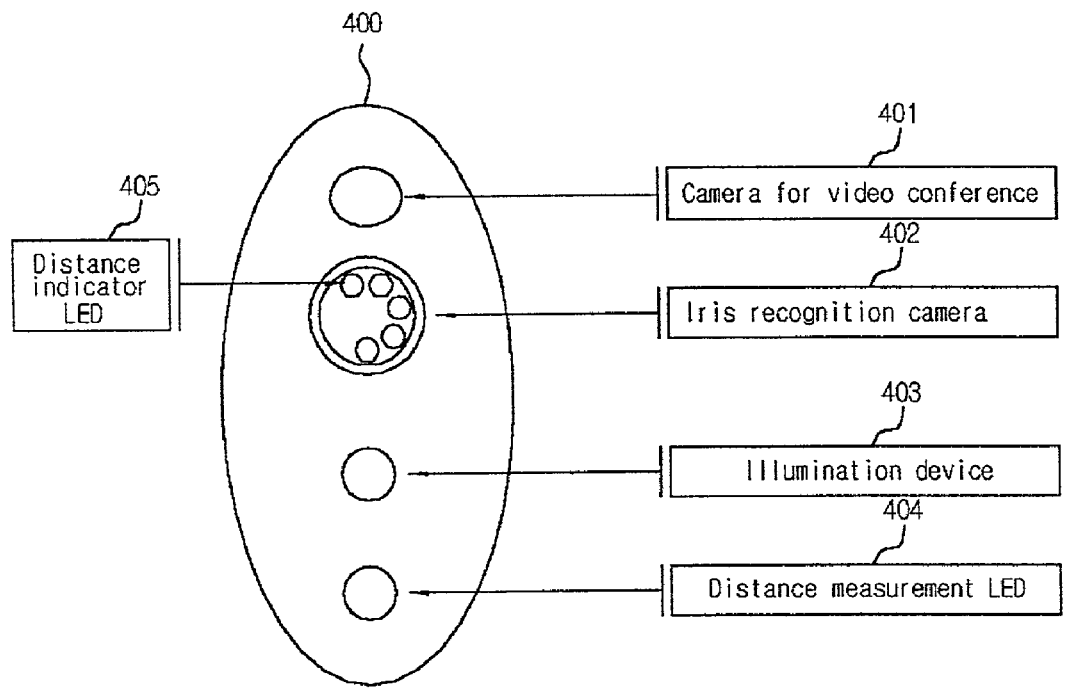
FIG. 9 is an explanatory diagram of a third preferred embodiment of the present invention.

FIG. 9 is a diagram explaining a third embodiment of the present invention.

Referring to FIG. 9, the main body of the iris recognition device for a video conference 400 according to the third embodiment of the present invention is mounted with the camera for a video conference 401, the iris recognition camera 402, the illumination device 403, and the distance measurement sensor (LED) 404.

Further, a distance indicator 405 for indicating the user's present position can be mounted at the inside of the iris recognition camera 402 for Particularly, the camera for a video conference 401 is used for acquiring images of the user, especially his face, participating in the video conference. The iris recognition camera 402 is used for acquiring the user's eye images that are eventually used for recognizing the user's iris. In addition, the illumination device 403 provides an illumination necessary for photographing iris images to be recognized. The distance measurement illuminator 404 is used for measuring the distance between the user and the camera. Preferably, the light emitting diode is used for the distance indicator 405.

In the meantime, the distance measurement LED 404 emits a designated infrared ray and projects the infrared ray to the user's face. And, the distance measurement LED 404 finds out the distance between the user and the camera based on the relative position of the light that has been projected to the user's face photographed by the camera for a video conference 401 or the iris recognition camera 402 to the position of the user and the light projected to the user's face in general.

Figure 10:
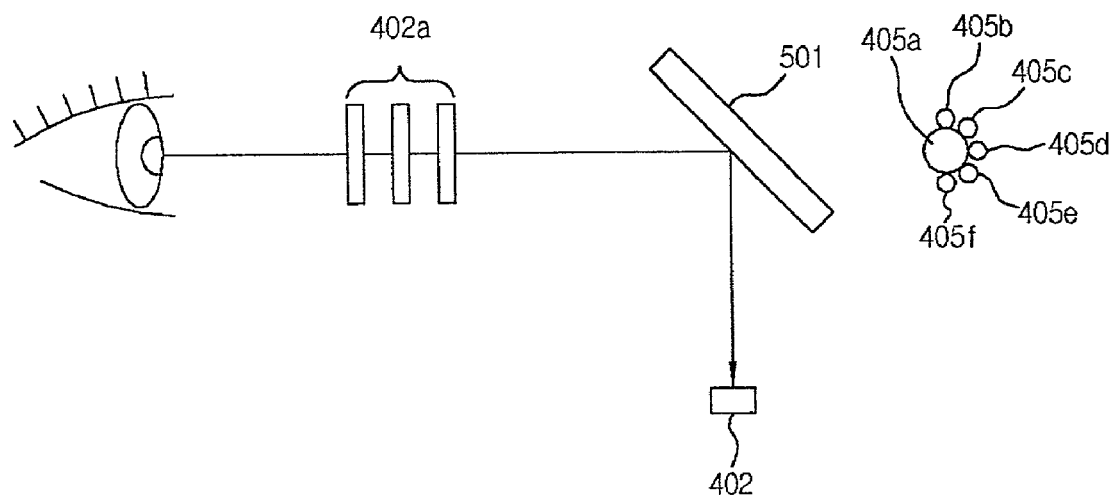
FIG. 10 is a schematic diagram of an optical system in which a distance indicator LED (light emitting diode) is visible through an iris recognition camera according to the third preferred embodiment of the present invention.

FIG. 10 is a schematic diagram of an optical system through which the user can see the distance indication LED through the iris recognition camera.

Referring to FIG. 10, the optical system includes the camera lens 402*a* for the iris recognition camera 402, the hot mirror 501, and the distance indication LED 405*a* through 405*f*.

Especially, the system helps the user to be able to see the hot mirror 501 through the iris recognition camera lens 402*a* by transmitting the visible ray that is outputted from the distance indication LED 405*a* through 405*f*. And, the obtained IR for iris recognition is reflected and sent out to the iris recognition camera 402.

The drawing illustrates a case how the moving distance and direction by the distance indicator 405 work inside of the iris recognition camera.

With reference to FIGS. 9 and 10, the operation of the third embodiment of the present invention is now explained below.

When the user enters within a certain distance away from the camera, the distance measurement sensor 404 detects the distance between the camera and the user. And, based on this detected information, the distance measurer calculates the distance between the user and the camera and turns on the LED light 405*a* through 405*f*.

Figure 2:
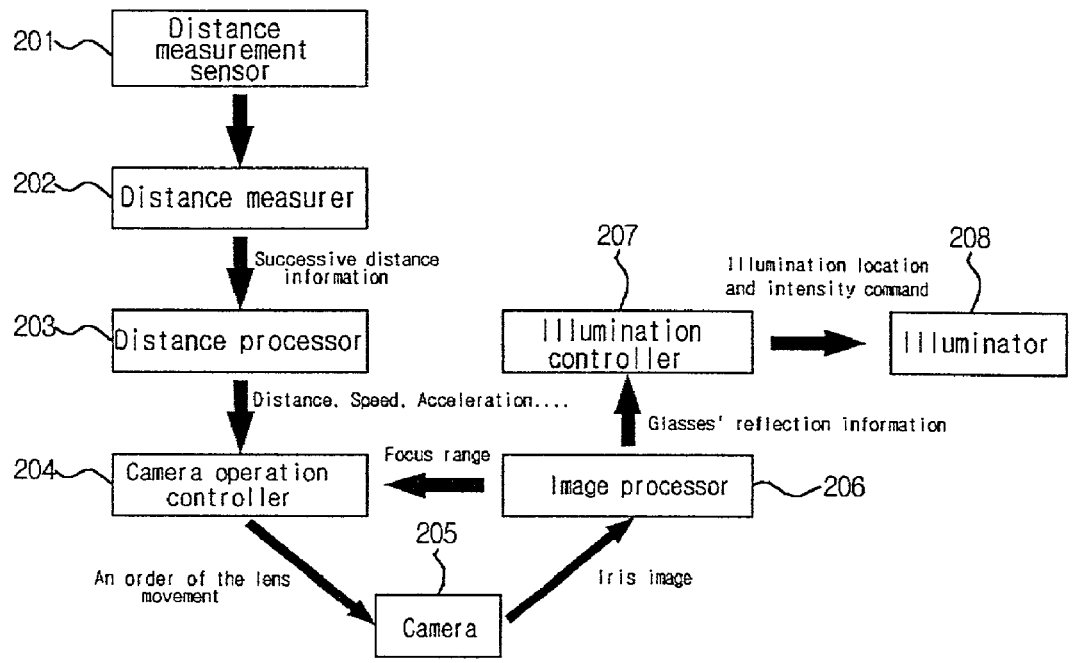
FIG. 2 is a block diagram showing a configuration of an autofocus adjusting device using a distance measurement sensor in the prior art.
Figure 3:
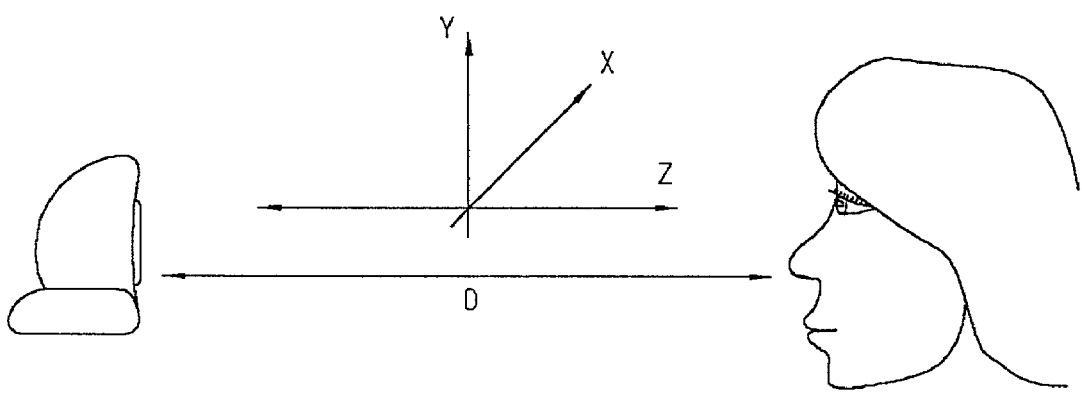
FIG. 3 is a diagram explaining a relation between a camera and a user in terms of position and distance in an iris recognition system.
Figure 4:
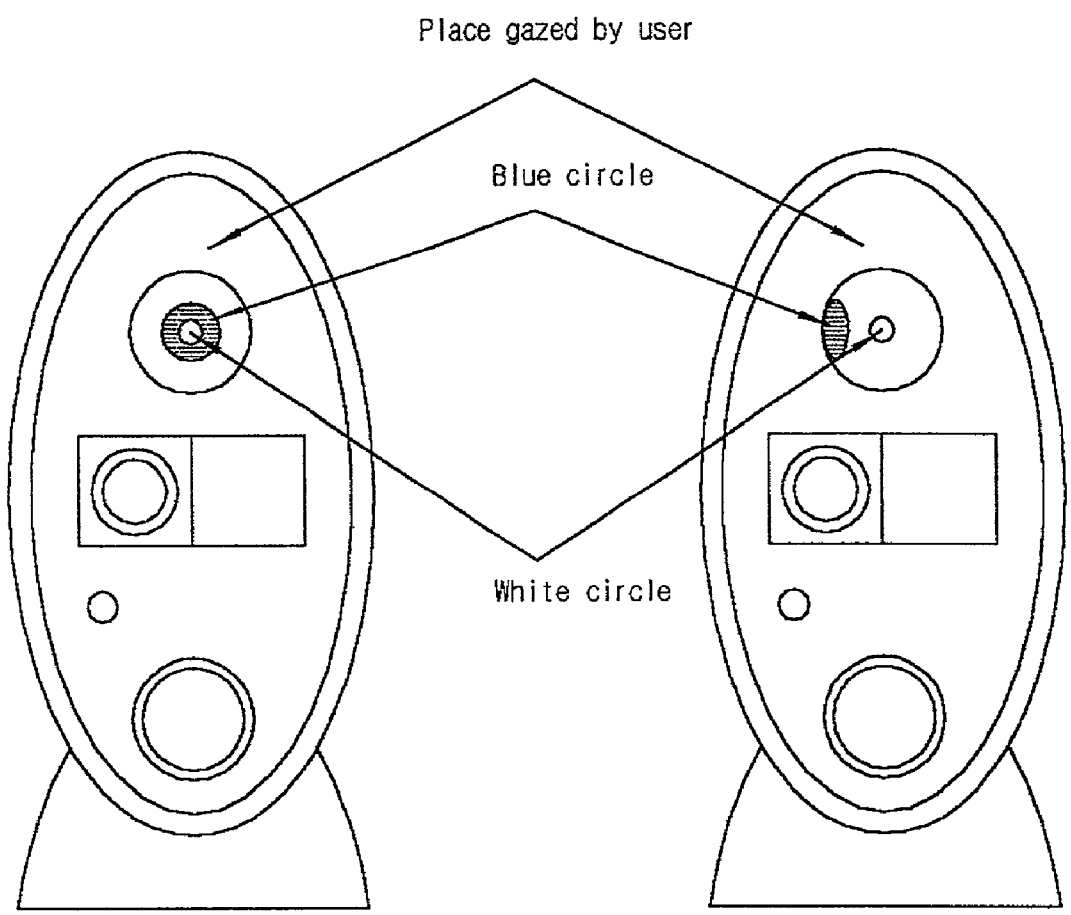
FIG. 4 is an explanatory diagram showing how an iris recognition system with a single focus is focused in the prior art.
Figure 5:
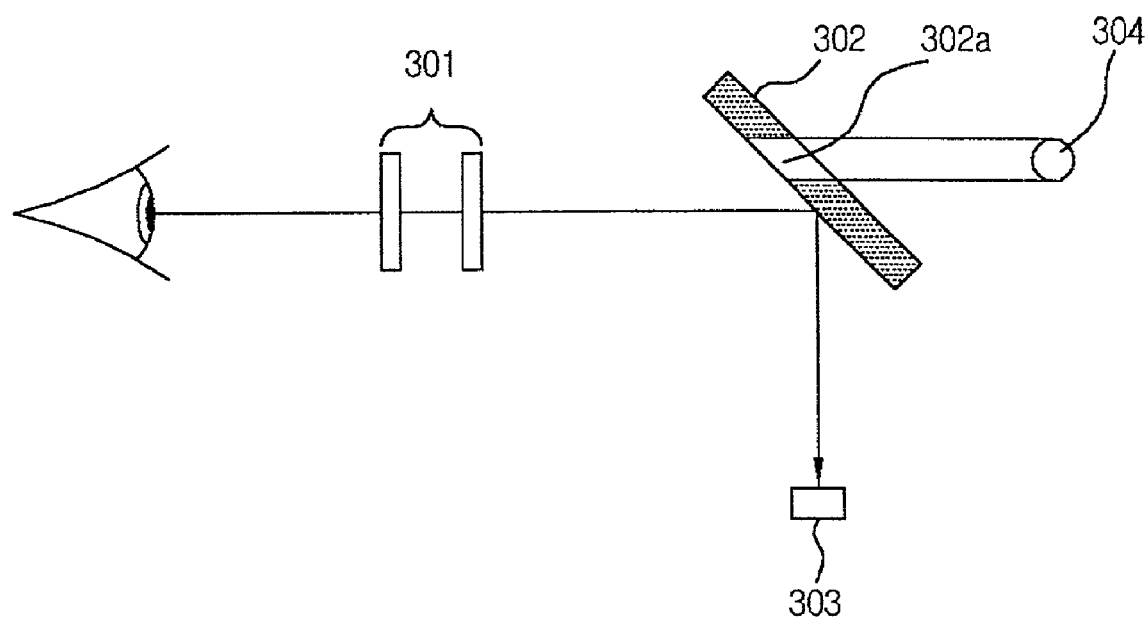
FIG. 5 is an explanatory diagram showing an internal configuration of an optical system for leading and guiding, in which a user can adjust a focal angle, in an iris recognition device for video conference in the prior art.

Here, the distance sensor and the distance measurer correspond to the distance measurement processor and the controller in FIGS. 1 and 2, respectively. Also, the distance between the user and the camera in the iris recognition system can be obtained by the distance calculation algorithm.

As the result of the calculation, if, for example, it turns out that the user is too close to the camera, the LED 405*b* at an upper portion of the central LED 405*a* turns to a red light, indicating that the user needs to be more distant for the camera. Besides, the user can also find out how far he should move backwards from the camera by looking at the lighting number and/or position of the LED.

In contrast, if the user is too far away from the camera, the LED 405*f* at a lower portion of the central LED 405*a* turns to a green light, indicating that the user need to come nearer to the camera. Again, by looking at the lighting number and/or position of the LED, the user learns how close he is to the camera.

Here, the number or color of the LED is mentioned only as an example. Also, the array method simply illustrates how it can be applied to the system. Therefore, the technical scope of the present invention is not limited by the number of color or the LED.

In fact, the light the LED 405*a* through 405*f* outputted is the visible ray so that the user can visually recognize the light as it transmits the iris recognition camera lens 402*a*. In this manner, the user can adjust the position by only looking at the iris recognition camera.

On the other hand, the central LED 405*a* can be used for a designated illuminator for adjusting the focal angle of the user.

Figure 11:
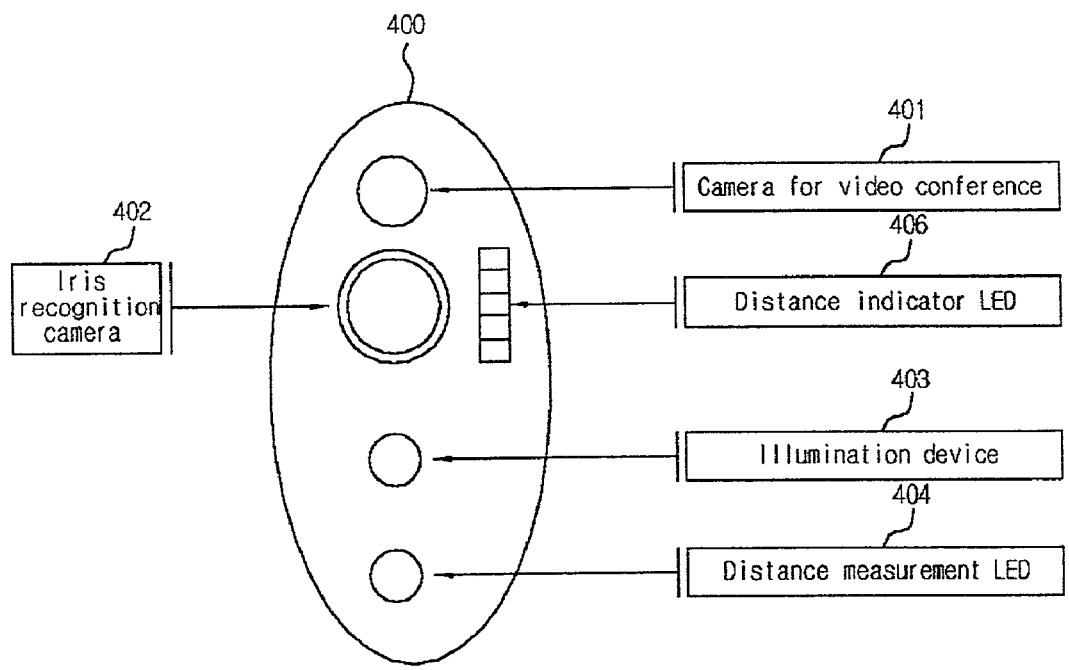
FIG. 11 is an explanatory diagram of a fourth preferred embodiment of the present invention.

FIG. 11 diagrammatically explains a fourth embodiment of the present invention.

As depicted in the drawing, the iris recognition device for a video conference includes the camera for a video conference 401, the iris recognition camera 402, the illumination device 403, and the distance measurement LED 404. Especially, the distance indicator 406 is formed at a very close place from the iris recognition camera 402.

Preferably, light emitting diodes arrayed in a bar shape are used for the distance indicator 406.

As mentioned before, the distance indicator 406 is placed very close to the iris recognition camera. It is so because the distance indicator needs to be placed in the watch of the user who is looking at the iris recognition camera.

The method for measuring the distance between the user and the camera in this embodiment is pretty much similar to that of the third embodiment.

The operation of the fourth embodiment is now explained with reference to FIG. 11.

When the user enters into a certain distance from the camera, the distance measurement LED 404 detects the distance between the user and the camera. And, based on the detected information, the distance measurer calculates the distance between the user and the camera, and turns on the distance indication LED 406.

Here, the distance sensor and the distance measurer correspond to the distance measurement processor and the controller in FIGS. 1 and 2, respectively. Also, the distance between the user and the camera in the iris recognition system can be obtained by the distance calculation algorithm.

As the result of the calculation, if, for example, it turns out that the user is too close to the camera, the LED at an upper portion among the distance indication LED 406 turns to a red light, indicating that the user needs to be more distant for the camera. Besides, the user can also find out how far he should move backwards from the camera by looking at the lighting number and/or position of the LED.

In contrast, if the user is too far away from the camera, the LED 405 at a lower portion of the LED 406 turns to a green light, indicating that the user need to come nearer to the camera. Again, by looking at the lighting number and/or position of the LED, the user can realize how close he is to the camera.

Here, the number or color of the LED is mentioned only as an example. Also, the array method simply illustrates how it can be applied to the system. Therefore, the technical scope of the present invention is not limited by the expression involving the number or color of the LED.

Therefore, the LED 406 is formed at the inside or outside of the iris recognition system near to the iris recognition camera 402 so that the user can visually recognize the light outputted form the LED 406 as he watches the iris recognition camera 402. In this way, all the user has to do for focusing the camera is to look at the iris recognition camera.

On the other hand, the fourth embodiment of the present invention, similar to the third embodiment, forms the central LED (refer to 405*a* in FIG. 10), which is used for a designated illuminator for adjusting the focal angle of the user.

Figure 12:
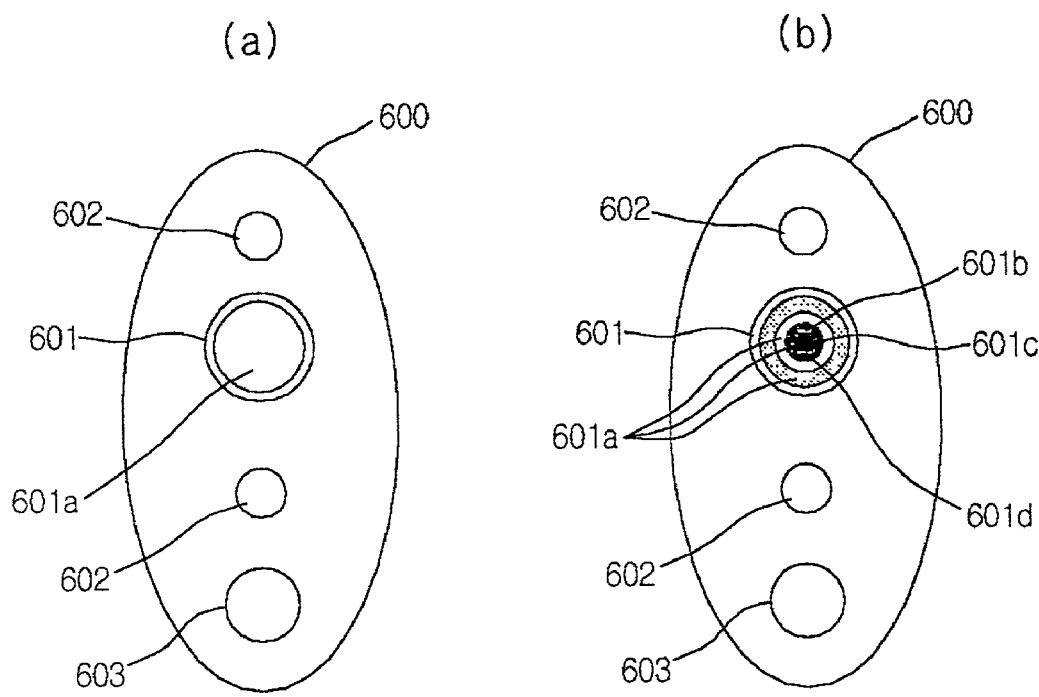
FIG. 12 is a front view of an optical system unit explaining a display device of a focal angle and a focal distance according to a fifth preferred embodiment of the present invention.

FIG. 12 diagrammatically explains a fifth embodiment of the present invention, and shows a front view of an optical system unit for explaining the display device of a focal angle and a focal distance.

Referring to FIG. 12, the main body of the iris recognition system applied to the fifth embodiment of the present invention is mounted with the iris recognition camera 601, the distance measurement LED 602, and the illumination device 603.

Also, according to the system, the light image displaying the focal angle and distance can be seen at the inside of the iris recognition system through the iris recognition camera 601.

Further, to measure the distance between the user and the camera, the system can include the camera for a video conference also. Here, the iris recognition camera 601 is used for acquiring the user's eye images necessary for recognizing the user's iris later. The illumination device 603 provides an illumination necessary for photographing iris images to be recognized. Lastly, the distance measurement LED 602 is used for measuring the distance between the user and the camera.

Particularly, the light the user sees through the iris recognition camera is divided into an angle displaying visible ray 601a and a distance indication LED 601b, 601c and 601d.

Meanwhile, the light outputted from the distance measurement LED 602 is projected to the user's face, and using the relative position of the light projected to the user's face, the distance between the user and the camera can be measured.

The operation of the fifth embodiment of the present invention is now explained as follows.

First of all, the angle displaying visible ray 601a confirms whether the focal angle between the user and the camera is well adjusted, and the distance indication LED 601b, 601c, and 601d confirms whether the distance between the user and the camera is properly adjusted as intended.

Then, the user, while looking at the iris recognition camera, is encouraged to move his face right and left or up and down under the commands from the angle displaying visible ray that has been projected from the inside of the iris recognition camera 601 and the distance indication LED, until he adjusts the focal angle and the focal distance accurately.

That is to say, as FIG. 12(a) shows, if the focal angle is not well adjusted, the angle displaying visible ray 601a that is projected from the inside of the iris recognition camera 601 is blurred or slanted towards one side, due to the lens formed on the line of the optical path. On the contrary, if the focal angle is well adjusted, as shown in FIG. 12(b), the user can clearly see the angle displaying visible ray 601a that is projected from the inside of the iris recognition camera 601 in the form of a concentric circle.

On the other hand, the angle displaying visible ray 601a, as discussed before, can be the projected light through the hot mirror (refer to 501 in FIG. 10) which is formed at the inside of the iris recognition system.

Therefore, the position where the angle displaying visible ray 601a is recognized accurately is where the focal angle conforms. Maintaining this state, the user receives the distance instruction from the distance indication LED 601b, 601c, and 601d in accordance with the distance between the user and the camera, which has been obtained using the distance measurement LED 602. In other words, if the distance between the user and the camera is appropriate, the central LED 601c turns on, which indicates the user is on the right position. Meanwhile, if the user is too close or too far from the camera, the corresponding LED 601b and 601d is turned on accordingly, guiding the user to come closer or go farther fro the camera.

Preferably, the distance indication LED 601b, 601c, and 601d are placed at the central part of the angle display visible ray 601a so that the user can recognize the ray more easily.

Figure 13:
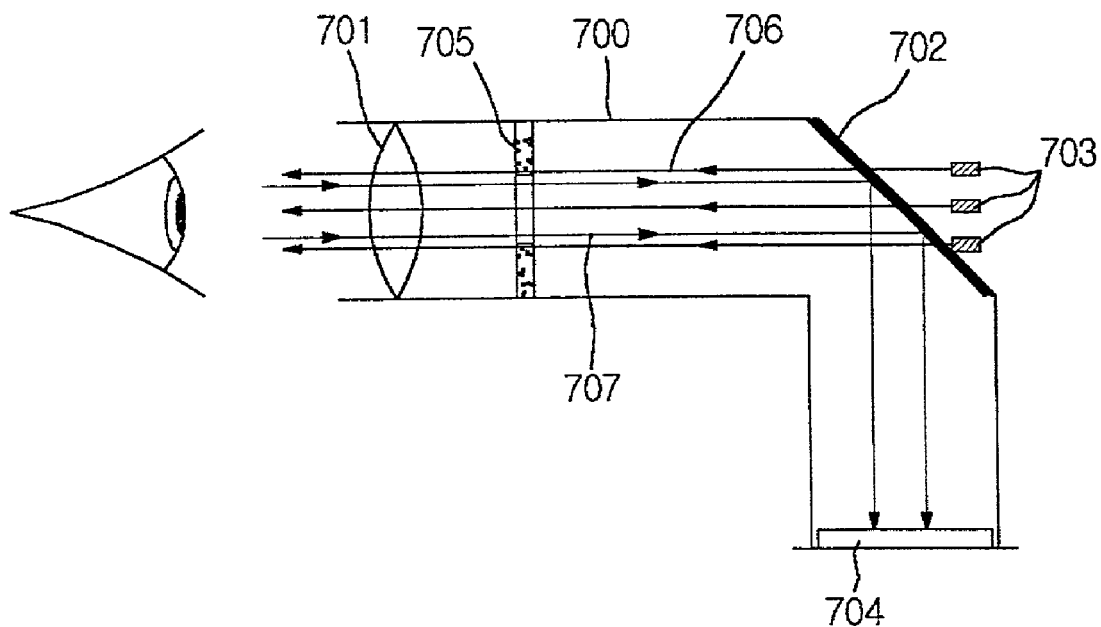
FIG. 13 is an explanatory diagram of a detailed configuration of an optical system according to the fifth preferred embodiment of the present invention.

FIG. 13 diagrammatically explains a detailed configuration of an optical system according to the fifth embodiment of the present invention.

As shown in the drawing, the optical system includes a tube 700, the iris recognition camera lens 701 mounted at the front side of the tube 700, the hot mirror 702 mounted at the rear side of the camera lens 701, and the LED 703 for outputting a display light for use of focal angle and distance.

In addition, a CCD (charge coupled device) 704 is formed in order to obtain reflected iris images by the hot mirror 702. And, an IR filter 705 is inserted on the optical path inbetween the camera lens 701 and the hot mirror 702.

More specifically, the system helps the user to see the hot mirror 702 through the iris recognition camera lens 701 by transmitting the visible ray emitted from the LED 703. However, the IR obtained to recognize the iris image is reflected and sent out to the iris recognition CCD 704.

As explained before, the LED 703 has the designated array and colors to instruct the iris recognition camera concerning the projected image on the concentric circle and moving direction (i.e., a direction approaching to the camera, stop, a direction going away from the camera).

Moreover, the IR filter 705 plays a role as an iris diaphragm. Primarily, the IR filter 705 filters off the infrared rays, but transmits all LED 703 light. This is how the projection image-light for indicating the focal angle and the distance is displayed on a full screen of the camera lens 701. In addition, the IR filter 705 makes the infrared rays inside of the iris recognition system invisible to the eyes of the user, and suppresses any possible interference for recognizing the user's iris.

In this manner, even when the user sometimes should look at a small sized camera lens 701, the focal angle and distance indication light is sufficiently visible to the user.

The reference numeral 706 in FIG. 13 indicates a light outputted form the LED 703 and is to be projected onto the full screen of the camera lens 701. And the reference numeral 707 in the same drawing shows a path where the user's iris image to be recognized is incidented onto the CCD 704, after passing through part of the IR filter 705.

As shown in FIGS. 12 and 13, the movement of the user and the procedure for adjusting the focus according to the movement are now explained referring the fifth embodiment of the present invention.

First of all, the user is supposed to move towards the direction to adjust the focal angle, while keeping looking at the iris recognition camera. At this time, the focal angle and the distance indication project images onto the user can be invisible, blurred or slanted to one side, or clearly seen on the concentric circle. On the other hand, the focal angle and the distance indication project images are emitted by the LED 703, and sent out to the user via the hot mirror 702, the IR filter 705 and the lens 701 in order.

In other words, if the angle by the user's gaze at the camera 601 precisely conforms with the focal angle, the gaze of the user will be on the straight line connecting the camera, the lens and the hot mirror—LED, meaning that the user can see the light on the concentric circle very clearly. Therefore, depending on whether the user sees the LED 703 light clearly or not, the user can decide almost intuitively if he adjusted the focal angle properly or not.

In case the focal angle is well adjusted, the use can easily adjust the distance by looking at the distance indication LED 601*b*, 601*c*, and 601*d* at the inside of the camera lens.

Since the light outputted from the LED 703 is the visible ray, the system can make the user recognize the ray through the iris recognition camera lens 701 as visibly as possible, by transmitting the visible ray through the hot mirror 702 and the IR filter 705. Besides, since the light emitted from the LED 703 is easily seen to the user whenever the user simply looks at the iris recognition camera, the system is indeed very advantageous of adjusting the focal angle and distance together at the state where the user feels very convenience and well focused.

Also, the IR filter 705 suppresses any interference of the image recognition because of the infrared rays that are generated inside of the camera.

Figure 14:
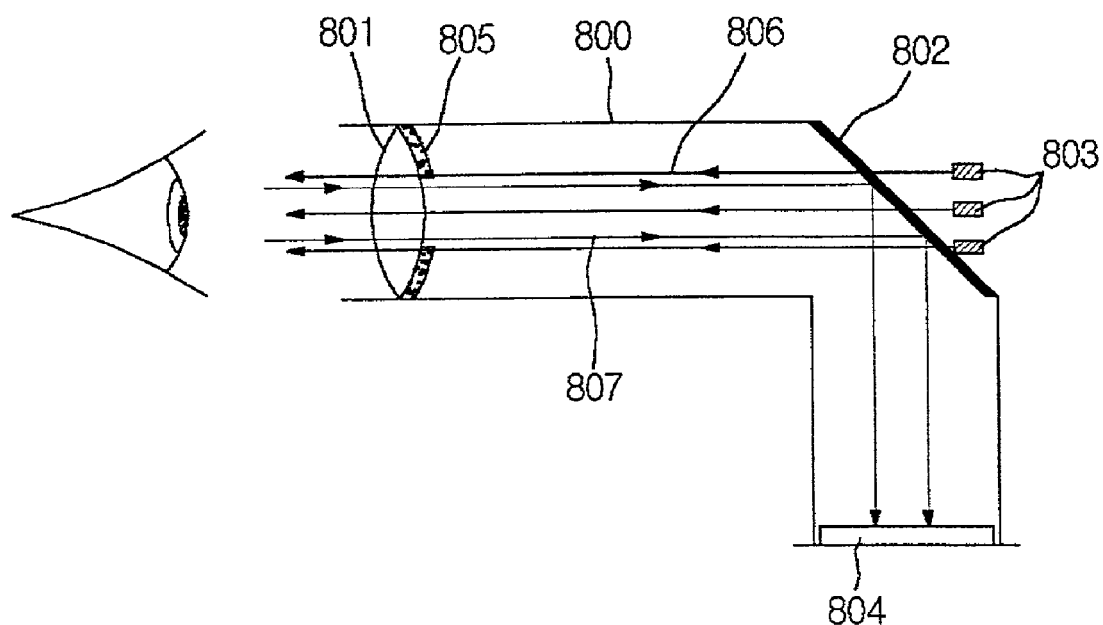
FIG. 14 is an explanatory diagram of a sixth preferred embodiment of the present invention.

FIG. 14 diagrammatically explains a sixth embodiment of the present invention.

The optical system in this embodiment includes a tube 800, the iris recognition camera lens 801 mounted at the front side of the tube 800, the hot mirror 802 mounted at the rear side of the camera lens 801, and the LED 803 for outputting a display light for use of focal angle and distance.

In addition, a CCD (charge coupled device) 804 is formed in order to obtain reflected iris images by the hot mirror 802. And, the rear side of the camera lens 801 is coated with an IR filter 805.

More specifically, the system helps the user to see the hot mirror 802 through the iris recognition camera lens 801 by transmitting the visible ray. And, the IR obtained to recognize the iris image is reflected and sent out to the iris recognition CCD 804.

As shown in FIG. 12, the LED 803 has the designated array and colors to instruct the iris recognition camera concerning the projected image on the concentric circle and moving direction (i.e., a direction approaching to the camera, stop, a direction going away from the camera).

Moreover, the IR filter 805 plays a role as an iris diaphragm. Primarily, the IR filter 805 filters off the infrared rays, but transmits all LED 803 light. This is how the projection image-light for indicating the focal angle and the distance is displayed on a full screen of the camera lens 801. In addition, the IR filter 805 makes the infrared rays inside of the iris recognition system invisible to the eyes of the user, and suppresses any possible interference for recognizing the user's iris.

In this manner, even when the user sometimes should look at a small sized camera lens 801, the focal angle and distance indication light is sufficiently visible to the user.

The reference numeral 806 in FIG. 14 indicates a light outputted form the LED 803 and is to be projected onto the full screen of the camera lens. And the reference numeral 807 in the same drawing shows a path where the user's iris image to be recognized is incidented onto the CCD 804, after passing through part of the IR filter 805.

The sixth embodiment of the present invention that is referred to as FIGS. 12 and 14 introduces the same procedure with that of the third embodiment, concerning how the user can adjust the focal angle and the distance.

Although the present invention has been applied to a variety of embodiment from 1 through 6, the core technique or philosophy of the present invention, that is, the method for recognizing the user's iris image more easily and conveniently by photographing the user image using the iris recognition camera, measuring the distance between the user and the camera, and displaying the distance to the user, is not changed, despite that the camera could be used for iris recognition only and not for a video conference contrary to what it was originally intended.

The present invention helps the user to adjust the distance for iris recognition in the iris recognition system with one single focus lens, by notifying the distance the user should move and by guiding the user towards the direction to focus the camera.

In addition, the present invention gets rid of any inconvenience the user experiences while trying to adjust the distance between the user and the camera, usually caused by the fact that he should keep looking at the iris recognition camera and a personal computer monitor at the same time until the camera is focused. However, the present invention successfully released the user from a sense of exhaustion in both eyes and increased convenience.

Next, the present invention leads the user into an appropriate domain for recognizing the user's iris by indicating the direction and distance the user should move. In this way, a better, that is, a more accurate and clear iris image is acquired within a short time.

Lastly, the present invention helps the user to easily adjust the focal angle and the focal distance in the iris recognition system with one single focus lens, by simply looking at the iris recognition camera being well focused to the adjustment only. Also, by making even the small sized camera lens be able to show the focal angle and distance indication LED light to the user as much as possible, the present invention increased the readability of the camera in general.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A display device of a focal angle and distance in an iris recognition system, the device comprising:
    a distance measurer for measuring a distance between a user and a camera;
    an iris recognition camera for obtaining image information for iris recognition of the user;
    a light emitter for optically indicating a moving direction and a moving distance to the user, in accordance with a measurement result of the distance measurer by transmitting the light through an iris recognition camera lens; and
    a light optics for guiding the moving direction and the moving distance indication light by the light emitter to be distinguished from an optical path for iris recognition;
    wherein the light of the light emitter illuminates and transmits at a first side of the light optics and iris recognition camera photographs the iris image reflected from a second side of the light optics.

2. The device of claim 1, wherein the light optics is a hot mirror, which reflects infrared rays and transmits visible rays, enabling the light emitted from the light emitter to transmit to the iris recognition camera lens and to be projected to the user.

3. The device of claim 1, wherein the light emitter further comprises:
    a central light emitting diode (LED) formed at a center; and at least one light emitting diode, being formed at an outside of the central LED, for displaying the distance between the user and the camera.

4. The display device of claim 3, wherein the at least one light emitting diode is positioned to contact the central LED at the periphery of the central LED.

5. The device of claim 1, wherein the light emitter further comprises:
an angle displaying visible ray for adjusting a focal angle; and
at least one distance indication light emitting diode, which is formed at a central part of the angle displaying visible ray.

6. The device of claim 1, further comprising an infrared ray filter, which transmits the light emitted from the light emitter towards a camera lens direction, and plays a role as an iris diaphragm against a camera light for recognizing an iris of a user.

7. The device of claim 6, wherein the infrared ray filter is mounted at a front or rear side on an optical path of the iris recognition camera lens.

8. The device of claim 6, wherein the infrared ray filter coats the front or rear side of the iris recognition camera lens.

9. The display device of claim 1, wherein the first and second surfaces are different surfaces of the light optics.

10. A display device of a focal angle and distance in an iris recognition system, the device comprising a plurality of light emitting diodes (LEDs) for indicating a forward-backward distance and a right and left and up and down direction a user should move in accordance with a distance measured by a distance measurer, in order to adjust the focal angle of the camera, wherein at least one of the light emitting diodes is turned on at a different position according to the distance measured by the distance measurer.

11. The display device of claim 10, wherein a first of the plurality of light emitting diodes is a central light emitting diode to indicate the right and left and up and down direction a user should move.

12. The display device of claim 11, wherein a second of the plurality of light emitting diodes is a distance indicating light emitting diode to indicate the backward-forward distance a user should move.

13. The display device of claim 12, wherein the second light emitting diodes is positioned at a periphery of the first light emitting diode.

14. The display device of claim 12, wherein the second light emitting diode is within a concentric circle of the first light emitting diode.

15. The display device of claim 10, wherein the at least one light emitting diode is positioned to contact a central LED being formed at a center, and at the periphery of the central LED.

16. A display device of a focal angle and distance in an iris recognition system, the device comprising:
an illumination device;
an iris recognition camera for acquiring user images including an iris image of the user through an irradiation from the illumination device;
a light emitter for indicating a focal angle to the user; and
a light optics for guiding the user to the optimal focal angle sharpness of a visible ray that is dependent on the focal angle, wherein the light optics transmits the visible ray irradiated from the light emitter onto the user and reflects an image of the user.

17. The device of claim 16, wherein an infrared ray is used for the illumination device.

18. The device of claim 16, wherein the light optics is a hot mirror.

19. The device of claim 16, wherein the light emitter is located at a rear side of the light optics.

20. The device of claim 16, wherein the light emitter, being located at a lower part of the light optics, further comprises a medium for guiding a light that is outputted from the light emitter to transmit to the rear side of the light optics, and to be projected at the end.

21. The device of claim 20, wherein the medium is a prism.

22. The device of claim 16, wherein the light emitter is a light emitting diode.

23. The display device of claim 16, wherein the reflected image of the user is an infrared ray.

* * * * *